(No Model.)
W. H. EVANS.
MACHINE FOR MOLDING PLUMBERS' ROUNDED CORNER SLABS.
No. 463,144.    Patented Nov. 17, 1891.
3 Sheets—Sheet 1.
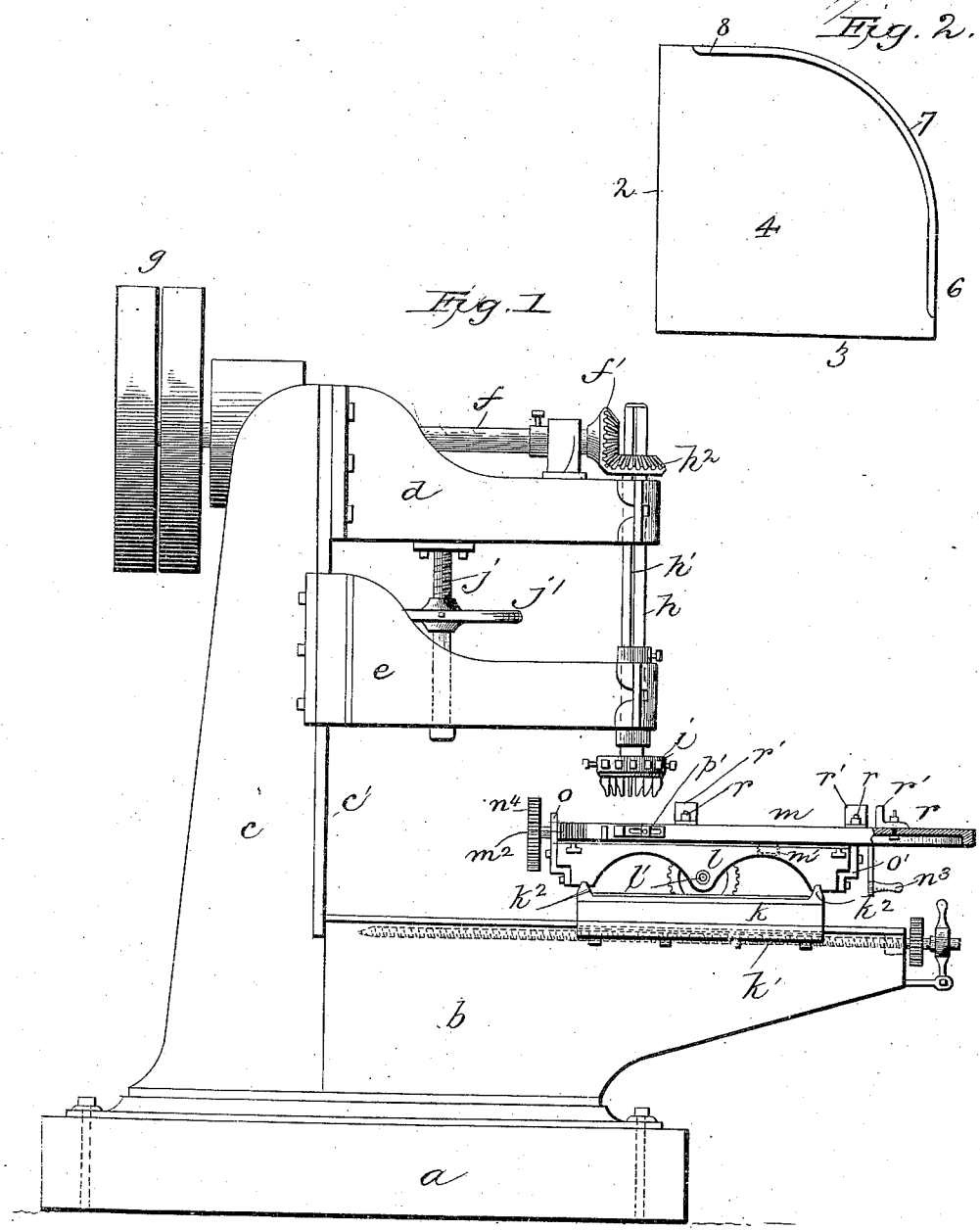
WITNESSES
INVENTOR
William H. Evans
by Wm. H. Sincuel
his Attorney
THE NORRIS PETERS CO., WASHINGTON, D. C.

(No Model.)

W. H. EVANS.
MACHINE FOR MOLDING PLUMBERS' ROUNDED CORNER SLABS.

No. 463,144. Patented Nov. 17, 1891.

3 Sheets—Sheet 2.

WITNESSES

INVENTOR
William H. Evans
by Wm. N. _____
his Attorney (No Model.)

W. H. EVANS.
MACHINE FOR MOLDING PLUMBERS' ROUNDED CORNER SLABS.

No. 463,144. Patented Nov. 17, 1891.

3 Sheets—Sheet 3.

WITNESSES

INVENTOR
William H. Evans
by Wm H. Finckel
his Attorney

UNITED STATES PATENT OFFICE.

WILLIAM H. EVANS, OF BALTIMORE, MARYLAND.

MACHINE FOR MOLDING PLUMBERS' ROUNDED CORNER-SLABS.

SPECIFICATION forming part of Letters Patent No. 463,144, dated November 17, 1891.

Application filed June 30, 1891. Serial No. 397,999. (No model.)

*To all whom it may concern:*

Be it known that I, WILLIAM H. EVANS, a citizen of the United States, residing at Baltimore, in the State of Maryland, have invented a certain new and useful Improvement in Machines for Molding Plumbers' Rounded Corner-Slabs, of which the following is a full, clear, and exact description.

The object of this invention is to provide a machine for molding the edges of those stone slabs which are used especially for the tops of those stationary wash-stands which are set in the angles of rooms, and more particularly for molding slabs which have two straight sides at right angles and two other straight sides of inferior length and having their angle cut away and the intermediate portion curved, resembling thus in a general way a quadrant. It is this edge composed of the combined straight and curved lines that it is specifically the design of my invention to mold.

My invention comprises in one machine means for molding—that is to say, for cutting a molding upon both the straight and curved edges of the slab.

I will proceed now to describe the principle of my invention and the best mode in which I have contemplated applying that principle and will then particularly point out and distinctly claim the part, combination, or improvement which I claim as my invention.

Figure 3:
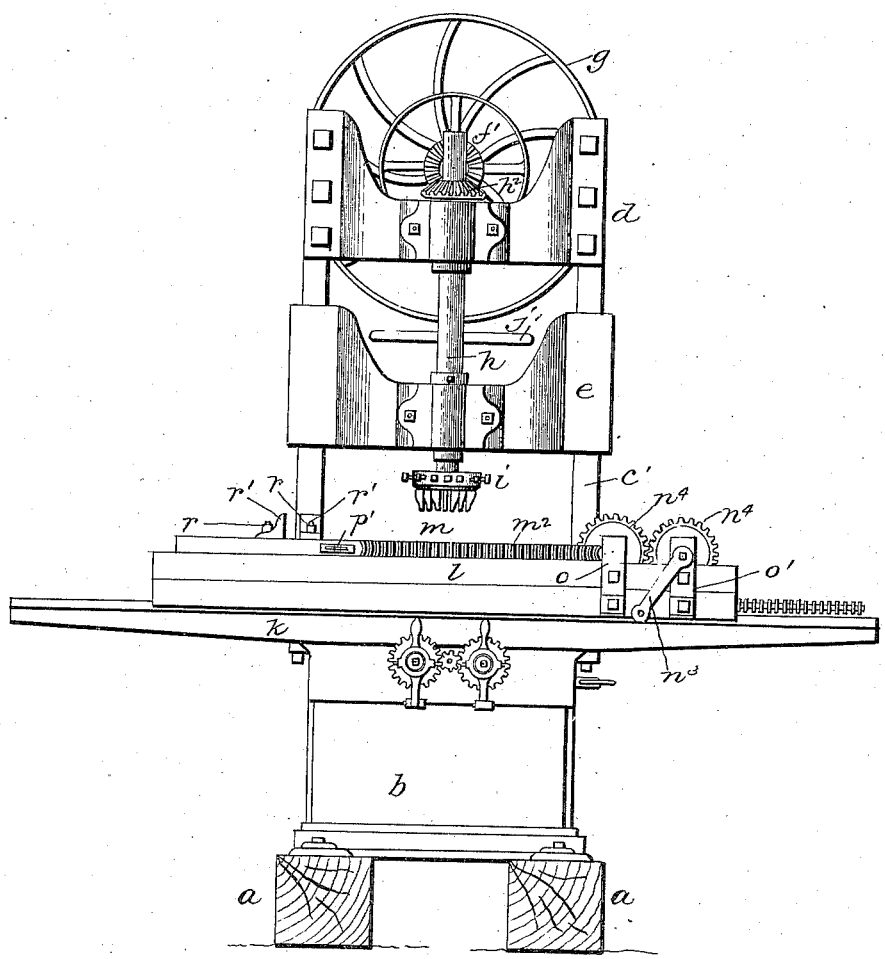
Figure 4:
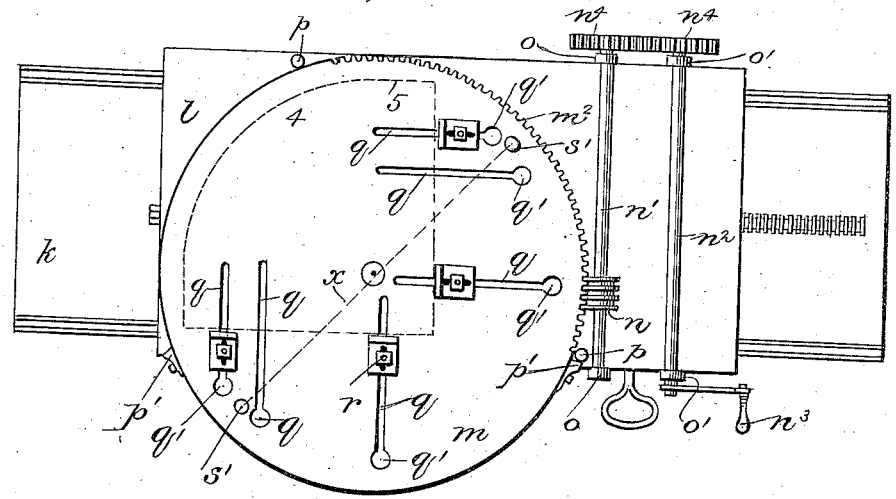
Figure 5:
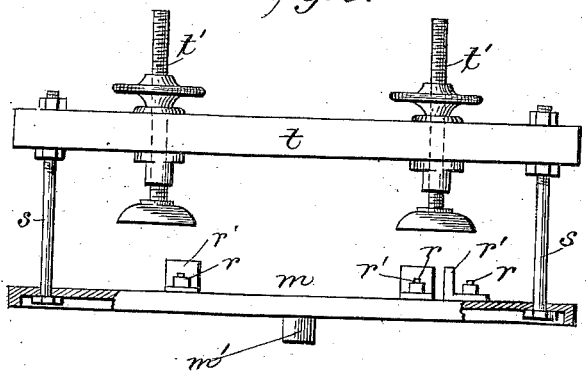

In the accompanying drawings, illustrating my invention, in the several figures of which like parts are similarly designated, Figure 1 is a side elevation. Fig. 2 is a plan view of a molded slab, the product of my machine. Fig. 3 is a front elevation. Fig. 4 is a plan of the table and carriages, and Fig. 5 is an elevation of the clamp for holding the slab upon the table.

I have shown my invention applied to a common form of marble molding and countersinking machine, of which $a$ designates the foundation timbers or pieces; $b$, the bed; $c$, the frame or neck; $d$, the head; $e$, the sliding bracket; $f$, the main shaft; $g$, the driving-pulleys on said shaft; and $h$ is the cutter-shaft, carrying a suitable cutter-head $i$. The cutter-shaft is fixed against longitudinal movement in the bracket $e$ and has a key or spline $h'$ to receive the bevel-gear $h^2$, which meshes with bevel-gear $f'$ on the driving-shaft $f$. The cutter-shaft has longitudinal movement through a support in the head $d$. The bracket $e$ is arranged upon rails $c'$ on the neck $c$ and is moved up and down thereon by the screw $j$ and hand-wheel $j'$, and carries with it the cutter-shaft and cutter-head, as usual, to enable the work or stock to be put in place, the cutter-head properly applied, and the cutter-head and thereafter the work to be removed. The bed $b$ also is supplied with the carriage $k$, which is traversed longitudinally thereof by the screw $k'$, and this carriage has ways $k^2$, upon which is mounted the carriage $l$, which is supplied with the screw $l'$, by which it may be moved longitudinally of the carriage $k$ and transversely of the bed. These two carriages and their traversing mechanism are here shown as of usual construction. I may apply my invention to machines of this character already in use, or I may build such a machine especially for the purposes of my invention. Moreover, either or both of the carriages $k$ and $l$ may be used; but I prefer to use both.

Now my invention is designed more especially as an attachment for such a machine. It consists of a circular or other table $m$, having a central gudgeon or lug $m'$, fitted into a socket in the carriage $l$, whereby said table may be revolved upon said carriage with the lug or gudgeon as its axis. If the table be circular, (and this is its preferred form,) then a segment of its edge is provided with worm-teeth $m^2$; but this segmental worm-gear may be attached to instead of made in the substance of the table. $n$ is a worm meshing with the segmental worm-gear and carried by a shaft $n'$. This shaft is supported in brackets $o$, which are made fast to the carriage $l$. A parallel shaft $n^2$ is supported in brackets $o'$, which also are made fast to the carriage $l$. Shaft $n^2$ is provided with a crank $n^3$, and the two shafts are connected in operation by the cog-wheels $n^4$ $n^4$.

The carriage $l$ is provided with the upright stop-pins $p$ $p$, on opposite sides and about a quarter-circle distant, and the table is provided with the fixed stops $p'$ $p'$, arranged at a greater distance apart and designed to cooperate with the stop-pins to arrest the rotation of the table upon its completing a quarter of a revolution.

The table is provided with slots $q$, arranged upon chords of the circle of the table, and these slots have enlarged heads $q'$, by means of which headed bolts $r$ (see Fig. 1) may be inserted and secured in the slots. These headed bolts receive longitudinally-slotted knees $r'$, and by them and the slots the said slotted knees may be adjusted toward and from right-angular lines drawn through the center of the table. These knees form abutments against which the two straight sides 2 3 of the slab 4 rest and serve to center the slab on the table.

The slab is held down upon the table by any suitable means. I have shown in Fig. 5 a suitable clamp for this purpose, which is composed of bolts $s$, arranged in holes $s'$ in the table and connected with and supporting a cross-bar $t$, which carries two or more headed and adjustable clamp-screws $t'$, which may be raised and lowered upon the work by rotation in the cross-bar $t$. The clamp is arranged obliquely upon the table, as indicated by the dotted line $x$.

The operation is as follows: The slab, having been first sawed or otherwise given the outline shown in Fig. 2, is laid and clamped upon the table $m$, as indicated by dotted lines in Fig. 4, with its angle in line with the diameter of the table and with the center of the circle in which the rounded portion of the slab is cut coincident with the axis of rotation of the table. The cutter-head is arranged opposite point 5 and is set in motion, and the carriage $l$ is moved toward the right, while the carriage $k$ is stationary and the table is not rotated. When the carriage $l$ has moved to the end of the straight line 6 of the slab next the curve 7, then the carriage $l$ is stopped and the worm-gearing set in motion and the table rotated, whereby the curved portion 7 of the slab is presented to the rotating cutter-head and that portion molded. When the straight portion 8 is reached, the rotation of the table is stopped and the carriage $l$ is again moved toward the right in order to mold that portion of the slab. Obviously the movement of the slab in straight lines may be accomplished by either of the carriages if the slab be arranged accordingly. In this way these rounded slabs may be molded very expeditiously, and so far as I am aware I am the first to organize an attachment for a machine by which such work is done successively and at practically one operation.

Now while my machine has been designed more especially for molding slabs of the character described, still it is obvious that it may be used for molding slabs that are true quadrants, and in this case the carriages will be moved only to bring the slab into position, and then the table will be revolved a quarter-turn to present the slab properly to the cutter. I mean, therefore, to include this use of my machine within my claims for the machine.

What I claim is—

1. An attachment for stone-molding machines, consisting of a table adapted to be revolubly attached to the traveling carriage of such machines and in proper relation to the cutting-tool, two series of slots in said table arranged at right angles to each other and on chords of the circle of the table, knees adjustably secured in said slots, a worm-toothed segment on said table, a worm to engage such segment, and a clamping device secured to and moving with the table, substantially as described.

2. An attachment for stone-molding machines, consisting of a table adapted to be revolubly attached to the traveling carriage of such machines and in proper relation to the cutting-tool, two series of slots in said table arranged at right angles to each other and on chords of the circle of the table, knees adjustably secured in said slots, a clamping device secured to said table, a worm-toothed segment on said table, a worm to engage such segment, and stopping and fixed stops to limit the rotation of said table, substantially as described.

In testimony whereof I have hereunto set my hand this 17th day of June, A. D. 1891.

WILLIAM H. EVANS.

Witnesses:
PH. H. HOFFMAN,
J. A. O. TUCKER.

Correction in Letters Patent No. 463,144.

It is hereby certified that in Letters Patent No. 463,144, granted November 17, 1891, upon the application of William H. Evans, of Baltimore, Maryland, for an improvement in "Machines for Molding Plumber's Rounded Corner-Slabs," an error appears in the printed specification requiring correction, as follows: In line 89, page 2, the word "stopping" should read *stop-pins;* and that the Letters Patent should be read with this correction therein that the same may conform to the record of the case in the Patent Office.

Signed, countersigned, and sealed this 24th day of November, A. D. 1891.

[SEAL.] CYRUS BUSSEY,
*Assistant Secretary of the Interior.*

Countersigned:
W. E. SIMONDS,
*Commissioner of Patents.*